(12) United States Patent
Duch et al.

(10) Patent No.: US 10,358,371 B2
(45) Date of Patent: Jul. 23, 2019

(54) APPARATUS AND METHOD FOR PRODUCING GLASS PRODUCTS FROM A GLASS MELT WHILE AVOIDING BUBBLE FORMATION

(71) Applicant: SCHOTT AG, Mainz (DE)

(72) Inventors: Klaus-Dieter Duch, Taunusstein (DE); Olaf Claussen, Undenheim (DE); Thomas Pfeiffer, Ingelheim (DE); Günter Weidmann, Flonheim (DE); Reinhard Wurm, Konnersreuth (DE)

(73) Assignee: SCHOTT AG, Mainz (DE)

( * ) Notice: Subject to any disclaimer, the term of this patent is extended or adjusted under 35 U.S.C. 154(b) by 57 days.

(21) Appl. No.: 15/496,713

(22) Filed: Apr. 25, 2017

(65) Prior Publication Data
US 2017/0305775 A1    Oct. 26, 2017

(30) Foreign Application Priority Data

Apr. 25, 2016  (DE) .............................. 102016107577

(51) Int. Cl.
| | |
|---|---|
| *C03B 5/187* | (2006.01) |
| *C03B 5/027* | (2006.01) |
| *C03B 5/16* | (2006.01) |
| *C03B 5/167* | (2006.01) |
| *C03B 5/24* | (2006.01) |

(52) U.S. Cl.
CPC ............ *C03B 5/187* (2013.01); *C03B 5/0272* (2013.01); *C03B 5/163* (2013.01); *C03B 5/1675* (2013.01); *C03B 5/24* (2013.01)

(58) Field of Classification Search
None
See application file for complete search history.

(56) References Cited

U.S. PATENT DOCUMENTS

| | | |
|---|---|---|
| 3,205,292 A | 9/1965 | Descarsin |
| 5,603,684 A | 2/1997 | Wetmore |
| (Continued) | | |

FOREIGN PATENT DOCUMENTS

| | | |
|---|---|---|
| DE | 19955827 | 6/2001 |
| DE | 102008042117 | 4/2010 |
| (Continued) | | |

*Primary Examiner* — Cynthia Szewczyk
(74) *Attorney, Agent, or Firm* — Ohlandt, Greeley, Ruggiero & Perle, L.L.P.

(57) ABSTRACT

An apparatus and a method for producing glass products from a glass melt, avoiding bubble formation, are disclosed, wherein the apparatus includes a crucible and an internally component for processing the glass melt, and wherein, for heating the glass melt, the apparatus comprises an AC generator which energizes the crucible or stirring crucible via electrical connection elements. The component or stirring system is connected via a current-limiting choke having a variable impedance with the power supply elements. The impedance of the current-limiting choke is adjusted so that a AC density existing in the glass melt lies between a lower limit value and an upper limit value. By means of a choke and by adjusting the impedance it can be achieved that the AC load of the system can be minimized and that simultaneously the water decomposition reaction at the precious metal surfaces can positively be influenced.

19 Claims, 4 Drawing Sheets

(56) References Cited

U.S. PATENT DOCUMENTS

| | | | | |
|---|---|---|---|---|
| 6,595,029 B1* | 7/2003 | Dick | ................... | C03B 17/04 |
| | | | | 427/11 |
| 6,629,437 B1 | 10/2003 | Baucke | | |
| 2002/0184922 A1 | 12/2002 | Dick | | |
| 2005/0026767 A1 | 2/2005 | Takase | | |
| 2006/0016222 A1* | 1/2006 | Pfeiffer | ................ | C03B 5/163 |
| | | | | 65/158 |
| 2006/0144089 A1* | 7/2006 | Eichholz | ............... | C03B 5/027 |
| | | | | 65/29.21 |

FOREIGN PATENT DOCUMENTS

| | | |
|---|---|---|
| DE | 102010037376 | 4/2011 |
| JP | S5626733 | 3/1981 |
| JP | H0967127 | 3/1997 |
| JP | 2002321934 | 11/2002 |
| JP | 2005060215 | 3/2005 |
| WO | 2007085397 | 8/2007 |

\* cited by examiner

APPARATUS AND METHOD FOR PRODUCING GLASS PRODUCTS FROM A GLASS MELT WHILE AVOIDING BUBBLE FORMATION

CROSS REFERENCES TO RELATED APPLICATIONS

This application claims benefit under 35 U.S.C. § 119(a) of Germany Application No. 102016107577.9 filed Apr. 25, 2016, the entire contents of which are incorporated herein by reference.

BACKGROUND OF THE PRESENT DISCLOSURE

The present disclosure relates to an apparatus for producing glass products from a glass melt while avoiding bubble formation, according to the preamble of apparatus claim 1, as well as a method which can be implemented with the apparatus according to the preamble of the independent method claim. In particular, the present disclosure relates to an apparatus and a method for the production of glass products, such as tube glass, from a glass melt which is conditioned, in particular homogenized, in an electrically heated crucible by means of a component located and/or mounted therein. Such a crucible can be, for example, a stirring crucible in which a stirring element is mounted so as to be rotatable as a component. For example, it can also be a crucible in which a tube is provided as a component in order to produce, for example, tubular glass according to the Vello method. The present disclosure is, however, intended to be applicable to any type of crucible and a component located therein.

For the production of glass products, apparatuses are used, which are also referred to as glass melting units and, more generally, also as production units. During production, the formation of bubbles in the respective glass melting unit is to be minimized or, if possible, completely prevented.

A typical glass melting unit comprises the area from the insert of the batch with the inserting machines to the outlet at which the still liquid glass is transferred to the post-processing devices (for shaping the desired glass product). These can be, for example, drip feeders, roller machines, pipe drawing plants or else a tin bath, onto which the liquid glass runs.

Glass melting furnaces generally consist of a region which is used for the formation of the liquid glass melt, a region in which the melt is refined, wherein the residual gas bubbles remaining after the melting process being removed from the melt, and a region which is used for conditioning. In this last region, the melt is generally still homogenized and brought to the temperatures necessary for the post-processing. The temperatures required for the entire melting process are strongly dependent on the type of glass. For example, soda-lime glasses, which are used, for example, for the production of window glass and glass containers, are melted at significantly lower temperatures than, for example, special glasses for display present disclosures or glass ceramics.

The melting tank can be purely fossil-heated, be provided with an additional electric heating or can also be operated completely fully electrically. As a combustion medium for the gas burners, which is usually preheated, normal air or even pure oxygen can be used.

The melting and refining zones can be located in a common basin or also in spatially separate sections. Various installations for influencing the flow are also state of the art.

The conditioning step is carried out in the working tank or in a gutter and distributor system. The latter can be constructed in a variety of ways, wherein it can contain one or more metallic components or installations. Stirring elements (stirrers, stirring needles, etc.) are often used for homogenization, which are stirring the glass melt located in a stirrer.

It is well-known that bubbles can merge or form in the glass melt in electrically heated glass melting units, such as in stirrers, which ultimately result in a significant deterioration in the product quality and, therefore, the formation of these should be completely suppressed.

DE 10 2010 037 376 A1 discloses a method and an apparatus for the production of glass products, with essential restrictions being placed on the electrical heating of glass melts. The formation of bubbles at and in the vicinity of the heating electrodes or of the current supply flanges caused by excessively high current loads can be positively influenced by the heating frequency used, the electrode materials used, and the properties of the glass itself.

Recommendations are given for the limitation of the current load to be adhered to different redox systems.

In DE 199 55 827 A1 a method and an apparatus are disclosed to improve the glass quality, wherein the (electroless) $O_2$ bubble formation is avoided due to the decomposition of water in that a DC voltage source is contacted to a conductive part (e.g. wall) of the aggregate and to the electrode protruding into the molten glass in order to produce a potential gradient in the glass melt, which causes the oxygen remaining after migration of the hydrogen to be ionized, i.e. is converted to negatively charged $O^2$ ions, which is—in contrast to neutral $O^2$ molecules—dissolve in an unlimited amount in the melt and thus do not agglomerate to gas bubbles.

Other methods and apparatuses for producing glass products while avoiding gas bubble formation are disclosed in the following documents:

DE 10 2008 042 117 A1, JP H 09 67 127 A and JP 2005 060 215 A.

Accordingly, the known methods and apparatuses either deal primarily with the problem of (electroless) gas bubble formation due to water decomposition or with the problem of (current-conditioned) gas bubble formation due to electrical alternating current heating. However, it would be a solution that would address and solve both problems in an efficient manner.

The object of the present disclosure is to further improve a method and an apparatus for the production of glass products of the type mentioned above so that both electroless and current-conditioned bubble formations are effectively prevented.

The object is achieved by an apparatus with the features of method claim 1 as well as by a method with the features of the independent apparatus claim.

Accordingly, the present disclosure relates to an apparatus which comprises a crucible, such as a stirring crucible, and a component located therein such as, for example, a rotatably mounted stirrer, and which comprises an alternating current unit for heating the molten glass, which feeds the crucible with current via current connection elements, wherein the component or stirrer is now connected to one of the current connection elements (e.g. lower heating flange) of the crucible or agitation bar via a current-limiting choke, which has a variable impedance. By means of such a current-limiting choke, by adjusting the impedance, it can be achieved simultaneously that the AC current load of the apparatus is minimized and that the water decomposition reaction is positively influenced.

The present disclosure applies to all types of crucibles and components located therein. If, for example, a stirring crucible or bar is provided with a stirrer, the stirrer is preferably connected directly to a heating flange by means of a sliding contact and an external cable. This changes the electric field and also the current density distribution in the apparatus. Practical tests have shown that the connection with the lower heating flange has the greatest effect on the bubble quality. Often, this effect was only a short time, so the connection was disconnected again. As a rule, any change, i.e. the clamping or disconnecting of the sliding contact, has already led to a reduction in the occurrence of bubbles and thus to an improvement in the product quality. Therefore, a reversing circuit of the sliding contact could be implemented with the possibility of presetting a time duration.

The present disclosure proceeds from the following surprising finding:

In order to reduce the current-induced bubble formation, it would be an easy to implement measure to reduce the alternating current and thus the current density as much as possible. Although this would avoid a high current density on the stirrer flights and the associated bubble formation, however, an alternating current which is too low might not be sufficient to form an effective direct current buffer for the water decomposition reactions on the conductive walls of the stirring crucible. Therefore, by means of the current-limiting choke proposed here, it is caused by setting the impedance to an optimum value for the respective configuration, a minimum bubble formation occurs so that the product quality can be optimized in a simple and very effective manner. Experiments have shown, that surprisingly the bubble occurrence reaches a minimum at a given impedance $Z_D$ of the choke, i.e. that too small AC current or an excessively high AC current in this branch leads to more bubbles in the product. In an embodiment of the present disclosure, the impedance of the choke or inductor can be adjusted in a simple manner via corresponding taps and via a resistor, if the current-limiting choke is implemented via a heating transformer. The secondary side or the primary side of the transformer can be used for this purpose. It is important to pay attention to the ratio of the transformer. The principle of the present disclosure and its effects are described in more detail below. For this, preferred exemplary embodiments are disclosed, which also result from the subclaims.

Accordingly, the stirring crucible is preferably made from a precious or noble metal or metal alloy, in particular from a Pt—Rh alloy, and a first heating flange mounted on an upper end of the stirring crucible and a second heating flange mounted at a lower end of the stirring crucible serve as current connection elements. Preferably, the stirrer element is connected to the second heating flange (at the lower end of the stirrer) via the current-limiting choke. The stirrer element(s) can be, for example, a stirrer or one or more stirring needles.

In a preferred embodiment of the present disclosure, the apparatus has a contact connection element, in particular a contacting flange, which contacts the current-limiting choke with the stirring crucible in an alternative manner to the contact via the current connection element. This additional contacting flange is not used for heating purposes but only for contacting the stirrer via the choke with the crucible.

The variable impedance of the current-limiting choke is preferably adjusted in such a way that an alternating current density occurring in the glass melt, in particular at the ends of stirrer wings or vanes, lies between a lower limit value and an upper limit value. In this respect, the lower limit value indicates a minimum required alternating current (AC) current density which provides on the inner wall of the stirring crucible a sufficient direct current (DC) buffer for preventing from water decomposition reactions with bubble formation. The upper limit value, in turn, specifies a maximum permissible AC density, above which bubbles are formed in the glass melt, in particular on stirrer blade ends and/or in the region of the current connection elements. With the adjusted impedance value one can thus find the optimum for AC load and DC protection.

In particular, the impedance of the current-limiting choke can also be set as a function of at least one of the following parameters:

frequency of a heating current generated by the alternating current generator;

material of the crucible, in particular of the stirrer of the stirring element and/or of the current connection elements;

geometry including the material thickness of the crucible, in particular of the stirrer of the stirring element and/or of the current connection elements;

impedances of the current connection elements of the contact connection element and/or of their supply lines;

the type of glass used, in particular the type and quantity of redox elements used in the glass melt.

The present disclosure and the resulting advantages will now be described in detail with reference to exemplary embodiments and with reference to the accompanying drawings, which show schematically the following graphical presentations.

DETAILED DESCRIPTION OF THE PREFERRED EMBODIMENTS

Figure 1:
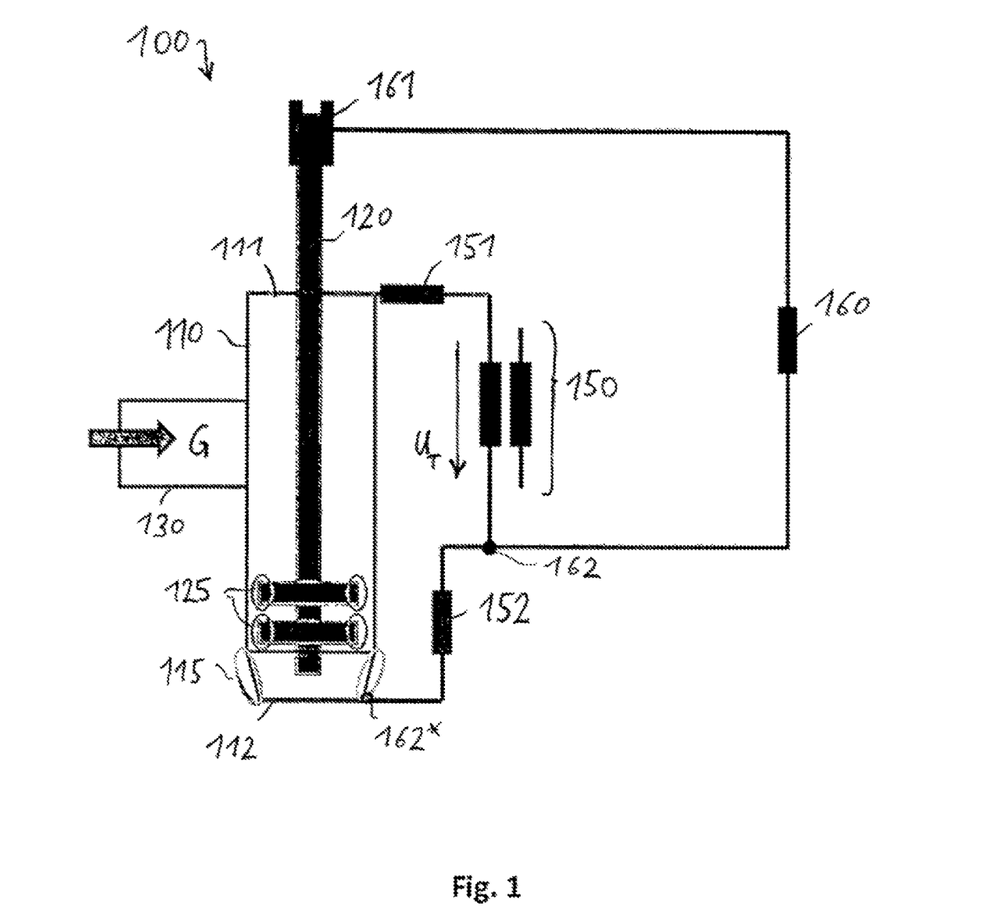
FIG. 1 shows the structure of the apparatus in a first embodiment.

The structure of an apparatus 100 according to the present disclosure in a first embodiment is shown schematically in FIG. 1. The apparatus can be understood to be a production or glass melting unit and in particular comprises a stirring crucible 110 in which a rotatably mounted stirring element 120 for stirring the glass melt G is arranged. The glass melt is fed to the stirring crucible 110 via a feed channel 130 or the like. In order to further heat the glass melt within the stirrer, the apparatus has an alternating current unit 150 which energizes the stirrer 110 via current connection elements 111 and 112. In this example, the current connection elements are formed by an upper heating flange 111 and a lower heating flange 112. The alternating current unit is implemented here by a heating transformer 150; the current supply lines being illustrated with their respective impedances 151 and 152. It is known per se that in the lower region of the stirring crucible, in particular at the stirrer wings or vanes, there are critical regions 125 for causing (current-conditioned) bubble formation by high current density. In the vicinity of the lower heating flange 112, there are regions 115 which are particularly critical for causing (currentless) bubble formation by water decomposition.

In order to effectively counteract both types of bubble formation, a current-limiting choke 160 is provided in the apparatus 100, which electrically connects the stirring element or member 120 to at least a part of the stirrer crucible, here to the lower heating flange 112. Preferably, the stirrer is directly connected to a heating flange 112 by means of a sliding contact 161 and an external cable. This changes the electric field and also the current density distribution in the apparatus. Practical tests have shown that the connection with the lower heating flange has the greatest effect on the bubble quality. Often, this effect was only a short time, so the connection was disconnected again. As a rule, any change, i.e. the clamping or disconnecting of the sliding contact, has already led to a reduction in the bubbles and thus to an improvement in the product quality. Therefore, a reversing circuit of the sliding contact could be implemented with the possibility of presetting a time duration.

When the stirrer 120 is directly connected to the lower flange 112, high AC currents (up to 100 A) can flow, which, in combination with high stirrer rotation speeds, adversely affect the service life of the sliding contact. Therefore, it is useful to reduce this AC current through a current-limiting choke. Further experiments have shown that the impedance $Z_D$ of the current-limiting choke 160 affects the bubble failure positively.

Accordingly, it is proposed here to connect the stirring element 120 via a current-limiting choke 160 with variable impedance to one of the current connection elements, here the heating flange 112, of the stirring crucible 110. In order to better understand the surprising effect of an optimally adjusted choke impedance, the effects on the bubble formation mechanisms are explained in detail here:

As described above, the essential source of bubbles is the water decomposition reaction. This reaction takes place primarily on the precious metal skin, which has a direct or indirect contact with the external atmosphere. It is influenced by the content of water in the glass, by the redox elements present in the glass, which form a buffer for the occurring oxygen, and by the flow field, which can transport oxygen-enriched glass regions away and thereby dilute them before bubbling occurs. Simulations show that high stirrer rotation speeds facilitate this removal. As a result of different diffusion constants of the involved redox species existing in the two half-waves of an alternating-current heating (non-reversible) of, for example, 50 Hz, there is a rise of a DC voltage potential which forms an additional buffer for the water decomposition reaction. Performed simulations show the effectiveness of this process.

For this reason, it is understandable that high AC currents and therefore high current densities at the tips of the stirrer wings lead to bubble formation, whereas low AC currents, which do not lead to a current density increase at the stirrer wings tips and thus cause no bubbles formation, however, are not sufficient to provide the required DC buffer for the water decomposition reaction on the noble metal wall of the unit.

Through the use of the variable-impedance current-limiting choke 160, an optimum with respect to AC loading and DC protection can now be achieved for each unit, such as, for example, for the stirrer-crucible system shown in FIG. 1.

Further investigations have shown that as an additional parameter for setting an optimized electric field with respect to the AC load and in crucible areas with respect to the water decomposition, a further flange is used which is not used for heating purposes, but only for contacting the stirrer via the choke. This embodiment is shown as apparatus 100' in FIG. 2.

Figure 2:
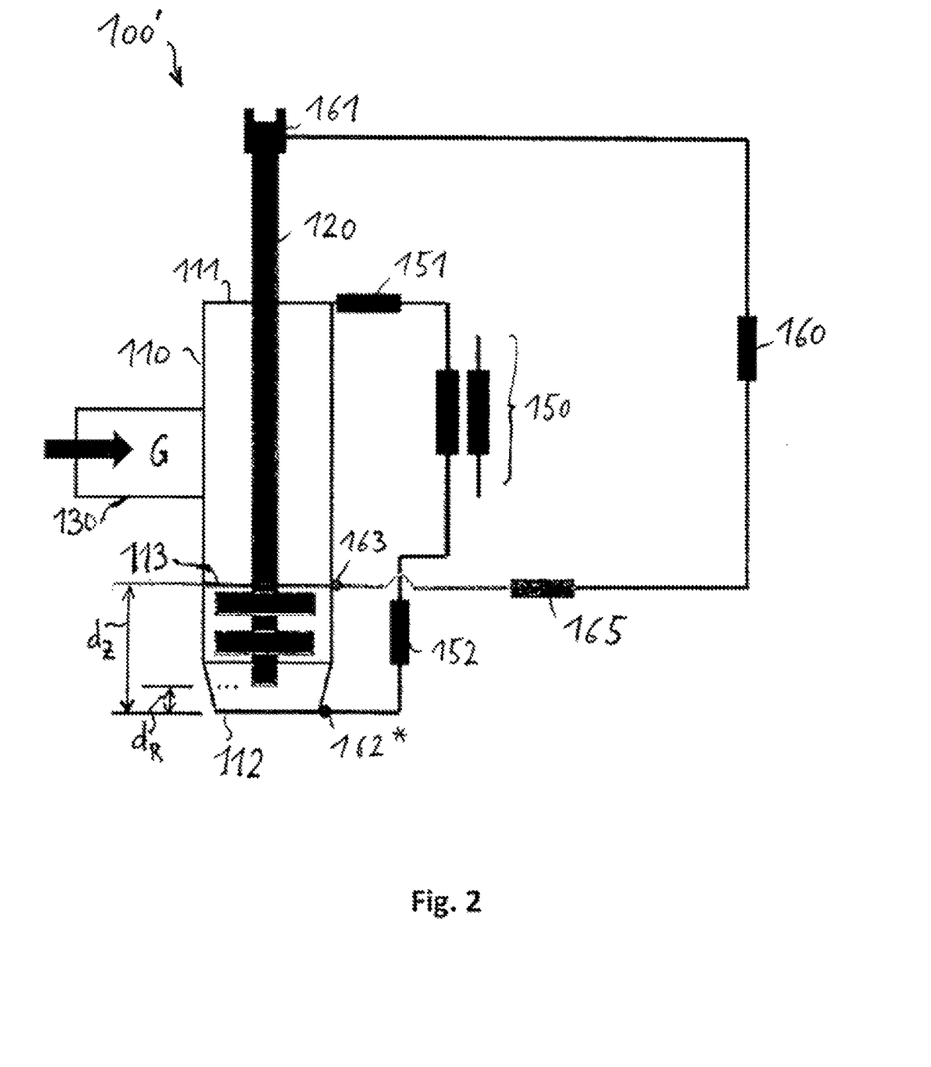
FIG. 2 shows the structure of the apparatus in a second embodiment.

As shown in FIG. 2, the apparatus 100' additionally has a contact connection element, here in the form of a contacting flange 113, which contacts the current-limiting choke 160 with the stirring crucible 110 as an alternative to the contact via the current connection element 112 (see FIG. 1). As a result, the sliding contact 161 is connected directly to the contacting flange 113 of the stirring crucible via the choke 160. The contacting flange 113 is not used for energizing the stirring crucible but only for contacting the upper end of the stirrer 120 with the lower region of the stirring crucible 110.

Also in the example shown in FIG. 2, the impedance ($Z_D$) of the current-limiting choke 160 is set so that AC density (I) existing in the molten glass G, in particular at the ends of the stirrer wings, lies between a lower limit value (Imin) and an upper limit value (Imax). The lower limit value (Imin) indicates a minimum required AC density, which can form a sufficient DC current buffer on the inner wall of the stirring crucible 110 for preventing water decomposition reactions with bubble formation. The upper limit value (Imax) indicates a maximum permissible AC density, above which bubbles formation occurs in the glass melt G, in particular on stirrer wings ends and/or in the region of the current connection elements.

The impedance ($Z_D$) of said current-limiting choke 160 can be set also in dependence on at least one of the following parameters:

frequency of a heating current generated by the alternating current generator 150;

material and/or geometry, such as, for example, material thickness, of the stirring stirrer 110, the stirring member 120 and/or the current connection elements 111, 112;

impedances $Z_O$; $Z_U$; $Z_Z$ of the current connection elements 111, 112, the contact connection element 113 and/or of their supply lines 151, 152 and 165;

the type of glass used, in particular the type and quantity of redox elements used in the glass melt.

For the geometry of the system following size specifications are mentioned as examples: The distance $d_R$ between the end of the stirring apparatus or system 120 and the bottom of the crucible 110 is, for example, 0-20 mm; the distance $d_Z$ between the bottom and the contact flange 113 may be for example 50-200 mm.

Here the following exemplary information is given for the dimensioning of the electrical components: The transformer 150 should provide a voltage $U_T$ of about 2-8 volts for the current supply via the flanges; a range of approximately 500-3000 A is to be mentioned as current intensity. The upper feed line 151 has an impedance of about 0.2-1 mOhm; the lower supply line 152 has one of about 1-5 mOhm. If, in FIG. 2, the current-limiting choke 160 is connected to the additional flange 113, then approximately 0.2-1 mOhm can be taken into account as an additional resistor or impedance 165.

The aim of the described circuits is to adjust the impedance of the current-limiting choke 160, including the sliding contact, so that the alternating current load, especially on the stirrer wings, becomes minimal, while maximizing the DC buffer.

If, by other means, the water decomposition reaction has been completely suppressed, the impedance of the choke can be adjusted, as described above, such that in the system at all positions the AC current load limit is not exceeded. This can be additionally supported by further impedances present in the system (as outlined in FIGS. 1 and 2).

Figure 3:
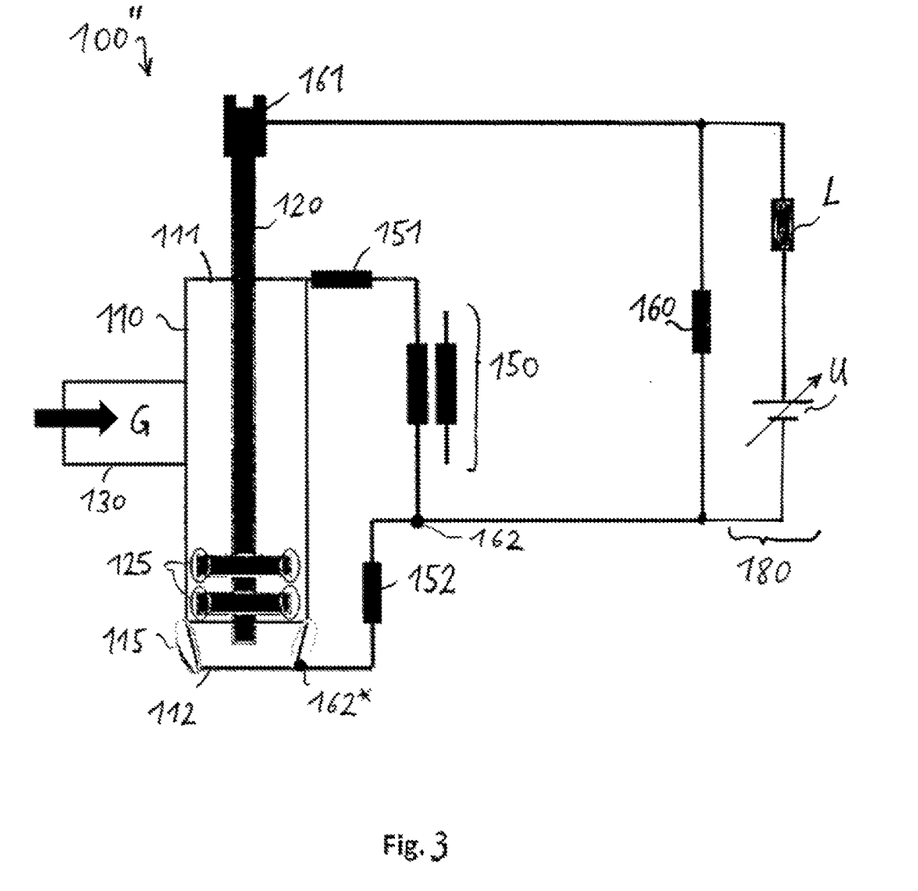
FIG. 3 shows the structure of the apparatus in a further embodiment.

In FIG. 3, an apparatus 100" is shown as a further embodiment, which initially has the same structure as the apparatus 100 from FIG. 1. In FIG. 3 there is additionally shown a regulated direct current source 180, which is connected in parallel with the current-limiting choke 160. The impedance L serves to effectively suppress the alternating current for the protection of the direct current apparatus, which produces the adjustable DC voltage U. With the aid of the direct current source 180, a direct current can also be provided, which can positively influence the water decomposition reaction at the noble metal boundary surfaces. Thus, the current-limiting choke 160 can be used more specifically for the avoidance of bubble formation caused by alternating current. In this case, the direct current required for the process would only be supplied by the direct current source.

Therefore, the additional DC power source 180 is especially for such cases of use in which the AC density I predominant in the melt does not fall into the process window ($I_{min}<I<I_{max}$), but approximates to the upper limit value ($I_{max}$)) or even exceeds this. Then, the DC power source 180 is activated and can provide additional, supporting DC protection. Preferably, the direct current source is constructed such that it has an inductance L which is connected in series with the actual apparatus which generates the direct voltage U and thus protects the direct current source from alternating current influences which are caused by the heating currents (alternating currents).

Figure 4:
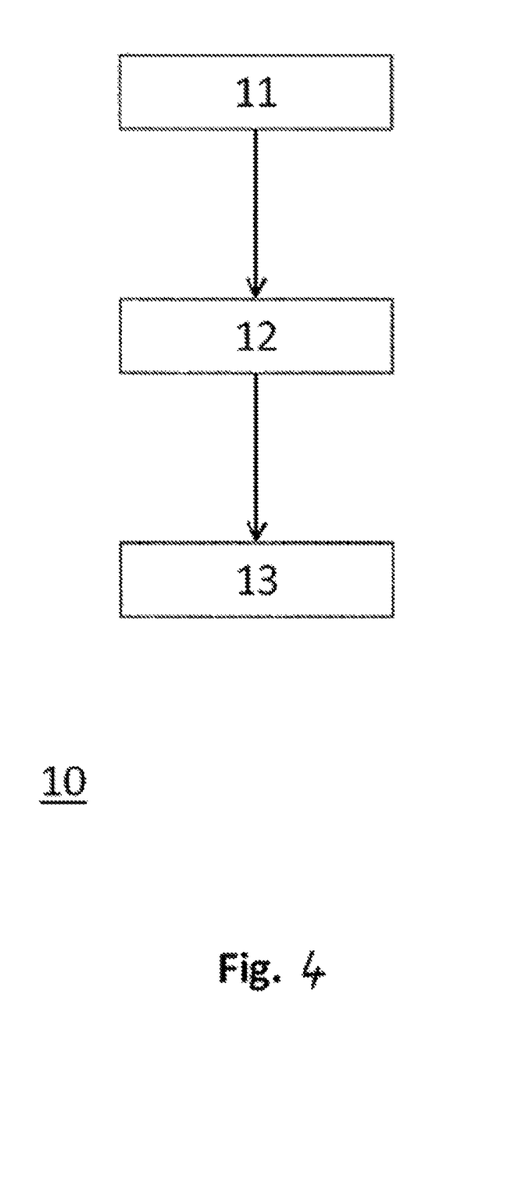
FIG. 4 is a flowchart for the method executed by the apparatus.

The process according to the present disclosure for the production of glass products is exemplarily illustrated by means of a flow chart depicted in FIG. 4. In the following, reference is made to this FIG. 4 and again to FIGS. 1-3:

The method 10 begins with the step sequence 11 in which the glass melt G is stirred in the stirring crucible 110 by means of the stirring element 120, wherein for heating the glass melt, the stirring crucible 110 is energized via the current connection elements 111; 112. In a subsequent step sequence 12, the stirring element 120 is connected to one of the current connection elements, here the lower heating flange 112, of the stirring crucible 110 via the current-limiting choke 160, which has the variable impedance. The impedance ($Z_D$) of the current-limiting choke 160 is adjusted such as described above, i.e. so that an alternating current density (I) existing in the glass melt lies between a lower limit value (Imin) and an upper limit value (Imax). In a further step 13, the impedance ($Z_D$) of the current-limiting choke 160 is adjusted also in dependence of at least one of the following parameters:

frequency of a heating current generated by the alternating-current generator 150;
material and/or geometry, such as, for example, material thickness, of the stirring stirrer 110, the stirring element 120 and/or the current connection elements 111, 112;
impedances $Z_O$; $Z_U$; $Z_Z$ of the current connection elements 111, 112, the contact connection element 113 and/or of their supply lines 151, 152 and 165;
the type of glass used, in particular the type and quantity of redox elements used in the glass melt.

The method 10 (FIG. 4) can thus be carried out by the disclosed apparatus (FIGS. 1 and 3). With regard to the configuration of the apparatus or of the unit, the following remarks are also made here:

The glass melt preferably does not have any direct contact with the mass. Direct grounding of the glass melt is normally carried out for reasons of personal safety, especially if the glass melting process is supported by an additional electric heating (EZH). Since the glass is an electrically conductive electrolyte at the temperatures necessary for the process, the quite high voltages which are applied to the heating electrodes can sometimes entail in the entire system. These personal safety precautions are mainly used in those areas of the system which are close to postprocessing, where manual handling often needs to be carried out, and a secure earth clearance can only be implemented and maintained with very high effort. In many cases, an earth-free construction is only to be realized at comparatively high costs, e.g. in a float bath.

In the entire earthing or grounding environment, the measured value detection technology used can also be taken into account, since in the measurement of voltage against ground, small currents (both AC and DC), which cannot be neglected, can always flow.

In many cases, before modeling, there are metallic components made of precious metal alloys, which are used to transport the liquid glass inside. In order to achieve a good chemical homogeneity and temperature constancy, the stirring elements are preferably used in the form of stirrers or stirring needles which operate in the stirring crucible or vessel. In order to provide, adjust and regulate the temperatures necessary for modeling or shaping, the metallic components are generally electrically heated. The simplest and most cost-effective way to do this is by feeding a DC electrical current via flanges, the so-called heating flanges.

Depending on the complexity of the component, two or more of these flanges are used. The heating frequency is often 50 Hz, which corresponds to the line frequency. Constant currents are not applied, because of the resistance between noble metal and glass, a part of the heating current would then always flow in the glass itself and thus would lead to electrolysis and bubble formation. Inductive heating is also possible, however, is normally applied to smaller components only, since the design and construction expenditure is very complex compared to the resistance heating. Indirect radiation heating is generally not used shortly before modeling or shaping, since in this region a fast temperature control is of importance. Since the noble metal components are supported by a refractory structure, the radiant heating is too slow to allow rapid temperature changes.

From the heating of the glass melt via heating electrodes, it is known per se that bubble formation takes place from a certain current density on the electrode surface. The still tolerable current density, which does not yet result in bubble formation, depends on the heating frequency, the electrode material used, and the type of glass itself. Thus, it is also known that when using 10 kHz instead of 50 Hz, a higher current density can be applied before bubbling occurs. It is also known that the tolerable current density when using noble metal alloys as electrode material is significantly lower than when using molybdenum or tungsten.

Meanwhile, the cost of a 10 kHz heater is almost similar to a 50 Hz heater, as for the equipment, such as converters, cables, matching transformers, etc. More complex, however, is the constructive implementation of the overall assembly because the induction phenomena occurring in the metallic periphery when 10 kHz is used, cannot be neglected.

The daily practice in combination with theoretical considerations and laboratory tests has shown that there are essentially two main causes for bubble formation on a noble metal component: the first cause is the so-called water decomposition, in which water dissolved in the glass is split into oxygen and hydrogen. The driving force for this reaction is the difference in the hydrogen partial pressure between the liquid glass and the outer space since the hydrogen diffuses through the noble metal plate at high temperatures. The second cause is the alternating current density in the vicinity of the current supply flanges and, in particular, at the stirrer wings ends when stirrers are used in the crucible. Generally, oxygen bubbles are formed by both mechanisms. Bubble formation due to cavitation at the stirrer wings ends has often been discussed, but it is usually difficult to detect them absolutely certain.

Since the stirrer or stirrer needle has a precious or noble metal on the glass-facing side due to quality requirements on the product, the entire stirrer is very electrically conductive in comparison to the glass. Therefore, it influences the electric field formed by the heating voltage of the stirring crucible. A part of the heating current will thus flow through the stirrer. Certain areas or regions can therefore exceed the critical AC current strength and lead to bubble formation. The so-called dilution effect, which is caused by the flow field of the glass (flow caused by the stirrer movement and throughput flow), also plays an important role in this. The oxygen-enriched glass is continuously transported away before the critical pressure for bubble formation is reached.

The stirrer could be connected directly to one of the heating flanges by means of a sliding contact and an external cable (without a current-limiting choke). This would already change the electric field and also the current density distribution in the system. Tests have shown that the connection with the lower heating flange has the greatest effect on the bubble quality. Often, however, this effect was only briefly, so that the connection had to be separated again. In doing so, any change, i.e. connecting or disconnecting of the sliding contact already led to an improvement in the bubble quality in the product. This could be implemented in a reversing circuit of the sliding contact with the possibility of setting a period of time.

However, high currents up to 100 A can flow when there is a direct connection of the stirrer with the lower flange, and in combination with high rotation speeds, the service life of the sliding contact will be thereby very low. Therefore, a current-limiting choke, that is, a so-called current limiting reactor, is mounted or fitted in the connection line between a stirrer and a flange (see FIG. 1). Further investigations and experiments have surprisingly shown that the bubble failure reaches a minimum at a given impedance $Z_D$ of the choke, which means that too small AC current or an excessively high AC current in that branch respectively leads to more bubbles in the product. The optimum impedance of the inductor can be as easily adjusted via corresponding tappings and via a resistor at the secondary side of the heating transformer.

To understand this surprising finding, the bubble forming mechanisms have been considered in detail and examined:

As described above, an essential source of bubbles is the water decomposition reaction. This reaction takes place primarily on the outer precious metal skin. It is influenced by the content of water in the glass, by redox elements present in the glass, wherein the redox elements constitute a buffer for the forming of oxygen and of the flow field, which can transport away oxygen-enriched glass areas and dilute it before it comes to a bubble separation. Simulations have shown that high stirrer speeds favor this removal. Due to different diffusion constants of the redox species involved in the two half-waves of 50 Hz heating (not reversible) there is an increase of a DC potential, which forms an additional buffer for the water decomposition reaction. Simulations have shown the effectiveness of this process.

For this reason it is understandable that high AC currents and therefore high current densities at the stirrer wings tips lead to bubble formation, while low AC currents, which do not lead to current density increase at the stirrer wings tips and thus do not cause bubbles, do not suffice to form a sufficient DC buffer for the water decomposition reaction on the outer noble metal wall.

To find now for each stirrer-crucible system an optimum regarding the AC load and the DC protection, the impedance of the current-limiting choke is adjusted, as described above with reference to FIGS. 1 and 3.

As an additional parameter for setting of an optimized electric field with respect to the AC load and crucible areas with respect to the decomposition of water, an additional flange may be used, which is not used for heating purposes, but only for contacting the stirrer via the current-limiting choke (see FIG. 2).

If the water decomposition reaction has ideally completely been suppressed, the impedance of the choke can be optimally adjusted, as described above, that it is at all positions below the AC current load limit in the system. This can additionally be supported by further impedances installed in the system (as outlined in FIGS. 1 and 2).

In summary, apparatuses and methods for bubble prevention are described in a precious metal system in preferred embodiments, wherein the stirring element is connected via a variable impedance with a heating flange, such that simultaneously the AC power load on the system is minimized and the water decomposition reaction is positively influenced. Preferably, the adjustment of the impedance of the choke is done via taps and resistors of a heating transformer.

LIST OF REFERENCE NUMBERS 100 apparatus for producing glass products (also called: glass melting unit)
G glass melt
110 stirring crucible
120 stirring element, designed here as a stirrer
130 feed channel for the glass melt
150 alternating current (AC) unit, designed here as a heating transformer
160 current-limiting choke with variable impedance
111, 112 power supply elements, here designed as top or bottom heating flanges
115 region of possible bubble formation by water decomposition
125 region of possible bubble formation due to the heating by alternating current (AC)
151, 152 impedances of the heating current supply lines
161 sliding contact at the top of the stirrer used as an upper connection point for the current-limiting choke
162, 162* connection points for contacting the current-limiting choke
165 impedance of the supply line of the additional connection point
113 contact connection element, here as an additional contacting flange for current-limiting choke
163 additional connection point for contacting the current-limiting choke
10 method for the production of glass products
11-13 process steps

What is claimed is:

1. An apparatus for producing glass products from a glass melt while avoiding bubble formation, the apparatus comprising:
   a crucible;
   a component, in the crucible, for processing the glass melt; and
   an alternating current unit that feeds the crucible with current via power supply elements, wherein the component is connected to one of the power supply elements of the crucible via a current-limiting choke, wherein the choke has a variable impedance ($Z_D$).

2. The apparatus according to claim 1, wherein the crucible is made of a precious metal or a precious metal alloy, and wherein the power supply elements comprise a first heating flange mounted at an upper end of the crucible and a second heating flange being at a lower end of the crucible.

3. The apparatus according to claim 1, wherein the crucible is a stirring crucible, and wherein the component is a stirring element.

4. The apparatus according to claim 3, wherein the stirring element has wings, and wherein the impedance ($Z_D$) of the current-limiting choke is adjusted so that an alternating current density (I) formed in the glass melt, at the ends of the stirrer wings, is between a lower limit value ($I_{min}$) and an upper limit value ($I_{max}$).

5. The apparatus according to claim 4, wherein the lower limit value ($I_{min}$) corresponds to a minimum required alternating current density that provides, providing at the inner wall of the crucibles, a sufficient direct current buffer which can prevent water decomposition reactions inducing a formation of bubbles, and the upper limit value ($I_{max}$) corresponds to a maximum permissible alternating current density above which bubbles are formed in the glass melt, at the stirring wings ends and/or in the region of the power supply elements.

6. The apparatus according to claim 4, wherein the impedance ($Z_D$) of the current-limiting choke depends on at least one of the following parameters:
the frequency of a heating current being produced by the alternating current unit;
the material of the stirring crucible, the stirring element, and/or the power supply elements;
the geometry, including a material thickness of, the stirring crucible, the stirring element and/or the power supply elements;
the impedances of the power supply elements of the contact connection element and/or of their supply lines; and
the type of glass used, the type and quantity of redox elements used in the glass melt.

7. The apparatus according to claim 4, wherein in an event that the existing alternating current density (I) reaches or exceeds the upper limit value (Imax), the regulated direct current source is activated.

8. The apparatus according to claim 1, further comprising a regulated direct current source that is connected in parallel to the current-limiting choke.

9. The apparatus according to claim 1, further comprising a contacting flange contacting the current-limiting choke with the crucible.

10. The apparatus according to claim 8, wherein the regulated direct current source comprises an inductance (L) which prevents the direct current source from alternating current influences coming from heating currents.

11. The apparatus according to claim 1, wherein the alternating current unit is a heating transformer, and wherein adjustment of the impedance ($Z_D$) of the current-limiting choke is made via taps and resistors of the heating transformer.

12. The apparatus according to claim 1, wherein the crucible is used in a in a tube drawing device, and wherein the element in the crucible is a tube or hollow needle by which tube glass is drawn from the glass melt by applying the Vello method.

13. The apparatus according to claim 1, wherein the crucible is made of a Pt—Rh alloy.

14. The apparatus according to claim 1, wherein the component is a stirrer or a stirring needle.

15. A method for the production of glass products from a glass melt while avoiding formation of bubbles, comprising the steps of:
processing the glass melt in a crucible with a component in the crucible; and
heating the crucible with power supply elements that are connected to an alternating current generator, wherein the component in the crucible is connected with the power supply elements of the crucibles via a current-limiting choke having a variable impedance ($Z_D$).

16. The method according to claim 15, wherein the component is a stirrer having stirrer wings, and wherein the impedance ($Z_D$) of the current-limiting choke is adjusted so that alternating current density (I) existing in the glass melt, at the ends of the stirring wings, is between a lower limit value ($I_{min}$) and an upper limit value ($I_{max}$).

17. The method according to claim 16, wherein the lower limit value ($I_{min}$) specifies a minimum required alternating current density, so that at the inner wall of the crucible a sufficient direct current buffer which prevents water decomposition reactions from inducing the formation of bubbles, and that the upper limit value ($I_{max}$) specifies a maximum permissible alternating current density above which bubbles occur in the glass melt, at the stirring wings ends and/or in the region of the power supply elements.

18. The method according to one of claim 15, wherein the current-limiting choke is connected with the crucible.

19. The method according to one of the claim 16, wherein the impedance ($Z_D$) of the current-limiting choke depends on at least one of the following parameters:
the frequency of a heating current being produced by the alternating current unit;
the material of the stirring crucible, the stirring element, and/or the power supply elements;
the geometry, including a material thickness of, the stirring crucible, the stirring element and/or the power supply elements;
the impedances of the power supply elements of the contact connection element and/or of their supply lines; and
the type of glass used, the type and quantity of redox elements used in the glass melt.

* * * * *